(12) United States Patent
Potter et al.

(10) Patent No.: US 7,266,693 B1
(45) Date of Patent: Sep. 4, 2007

(54) VALIDATED MUTUAL AUTHENTICATION

(75) Inventors: Eric R. Potter, Tigard, OR (US); Peter M. Skirvin, Portland, OR (US)

(73) Assignee: U.S. Bancorp Licensing, Inc., Minneapolis, MN (US)

( * ) Notice: Subject to any disclaimer, the term of this patent is extended or adjusted under 35 U.S.C. 154(b) by 0 days.

(21) Appl. No.: 11/674,422

(22) Filed: Feb. 13, 2007

(51) Int. Cl.
*H04L 9/00* (2006.01)

(52) U.S. Cl. ...................... 713/169; 382/249
(58) Field of Classification Search ............ 713/169
See application file for complete search history.

(56) References Cited

U.S. PATENT DOCUMENTS

| | | | |
|---|---|---|---|
| 5,559,961 A * | 9/1996 | Blonder ................ | 726/18 |
| 5,857,025 A | 1/1999 | Anderson et al. | |
| 5,987,136 A | 11/1999 | Schipper et al. | |
| 6,078,665 A | 6/2000 | Anderson et al. | |
| 6,209,104 B1 | 3/2001 | Jalili | |
| 6,232,970 B1 * | 5/2001 | Bodnar et al. ........... | 715/708 |
| 6,278,453 B1 * | 8/2001 | Bodnar ................ | 715/764 |
| 6,310,634 B1 * | 10/2001 | Bodnar et al. ........... | 715/854 |
| 6,417,874 B2 * | 7/2002 | Bodnar ................ | 715/854 |
| 6,643,383 B1 | 11/2003 | Dugelay | |
| 6,661,904 B1 | 12/2003 | Sasich et al. | |
| 6,674,875 B1 * | 1/2004 | Phillips et al. ........... | 382/100 |
| 6,686,931 B1 * | 2/2004 | Bodnar ................ | 715/741 |
| 6,718,471 B1 * | 4/2004 | Kashima ................ | 726/9 |
| 6,782,101 B1 * | 8/2004 | Huntress ................ | 380/44 |
| 6,782,120 B2 | 8/2004 | Mödl et al. | |
| 6,882,737 B2 * | 4/2005 | Lofgren et al. ........... | 382/100 |
| 6,934,860 B1 | 8/2005 | Goldstein | |
| 6,954,862 B2 * | 10/2005 | Serpa ................ | 726/5 |
| 6,971,010 B1 | 11/2005 | Abdel-Mottaleb | |
| 6,980,081 B2 * | 12/2005 | Anderson ............... | 340/5.53 |
| 7,010,144 B1 | 3/2006 | Davis et al. | |

(Continued)

FOREIGN PATENT DOCUMENTS

WO  WO 9842099 A1 * 9/1998

OTHER PUBLICATIONS

El-Khamy et al. A New Fuzzy PN Codes based Color Image Encryption Technique, 2005.*
Antone Gonsalves, Yahoo Adds Anti-Phishing Sign-In Seal, Aug. 22, 2006, <http://www.techweb.com/article/printableArticleSrc.jhtml?articleID=192203159>.*
Haseyama et al., Image authentication based on fractal image coding without contamination of original iimage, 2003.*

(Continued)

*Primary Examiner*—Nasser Moazzami
*Assistant Examiner*—David G Cervetti
(74) *Attorney, Agent, or Firm*—Foley & Lardner LLP

(57) ABSTRACT

A method of authenticating a user through a validated mutual authentication system is provided. In an exemplary embodiment, the method includes establishing a validating fractal image during an enrollment or other process. A plurality of fractal images are provided to a client during an authentication attempt by the user, and the plurality of fractal images includes the validating fractal image. Fractal image selection data is received from the client, and the system uses the received fractal image selection data to determine a fractal image selected by the user from the plurality of fractal images. The user is authenticated only if the fractal image selected by the user is the validating fractal image.

16 Claims, 5 Drawing Sheets

U.S. PATENT DOCUMENTS

| | | | |
|---|---|---|---|
| 7,021,534 B1* | 4/2006 | Kiliccote | 235/380 |
| 7,100,049 B2* | 8/2006 | Gasparini et al. | 713/170 |
| 7,114,074 B2 | 9/2006 | Alasia et al. | |
| 7,114,083 B2* | 9/2006 | Devine et al. | 707/10 |
| 7,133,522 B2 | 11/2006 | Lambert | |
| 7,172,113 B2* | 2/2007 | Olenick et al. | 235/380 |
| 7,174,462 B2* | 2/2007 | Pering et al. | 713/182 |
| 7,219,368 B2* | 5/2007 | Juels et al. | 726/2 |
| 2001/0037468 A1* | 11/2001 | Gaddis | 713/202 |
| 2002/0029341 A1* | 3/2002 | Juels et al. | 713/184 |
| 2003/0005338 A1 | 1/2003 | Solioz | |
| 2003/0007639 A1 | 1/2003 | Lambert | |
| 2003/0014637 A1 | 1/2003 | Ellison et al. | |
| 2003/0093699 A1* | 5/2003 | Banning et al. | 713/202 |
| 2003/0105966 A1 | 6/2003 | Pu et al. | |
| 2003/0118185 A1 | 6/2003 | Lambert | |
| 2003/0156011 A1 | 8/2003 | Modl et al. | |
| 2003/0182246 A1* | 9/2003 | Johnson et al. | 705/76 |
| 2003/0191947 A1* | 10/2003 | Stubblefield et al. | 713/183 |
| 2003/0210127 A1* | 11/2003 | Anderson | 340/5.27 |
| 2004/0010721 A1* | 1/2004 | Kirovski et al. | 713/202 |
| 2004/0024709 A1* | 2/2004 | Yu et al. | 705/43 |
| 2004/0030934 A1* | 2/2004 | Mizoguchi et al. | 713/202 |
| 2004/0034801 A1 | 2/2004 | Jaeger | |
| 2004/0073795 A1* | 4/2004 | Jablon | 713/171 |
| 2004/0093527 A1* | 5/2004 | Pering et al. | 713/202 |
| 2004/0111648 A1 | 6/2004 | Fujisawa | |
| 2004/0123134 A1 | 6/2004 | Sasich | |
| 2004/0172564 A1* | 9/2004 | Federova et al. | 713/202 |
| 2004/0187027 A1 | 9/2004 | Chan | |
| 2004/0230843 A1* | 11/2004 | Jansen | 713/202 |
| 2004/0250083 A1* | 12/2004 | Schwab | 713/182 |
| 2004/0250138 A1* | 12/2004 | Schneider | 713/202 |
| 2004/0260955 A1 | 12/2004 | Mantyla | |
| 2005/0003799 A1* | 1/2005 | Kang | 455/411 |
| 2005/0060554 A1* | 3/2005 | O'Donoghue | 713/183 |
| 2005/0069170 A1* | 3/2005 | Alasia et al. | 382/100 |
| 2005/0086161 A1* | 4/2005 | Gallant | 705/39 |
| 2005/0144450 A1 | 6/2005 | Voice | |
| 2005/0177726 A1 | 8/2005 | Alasia et al. | |
| 2005/0177867 A1 | 8/2005 | Toutonghi | |
| 2005/0188205 A1* | 8/2005 | Alasia et al. | 713/176 |
| 2005/0193198 A1 | 9/2005 | Livowsky | |
| 2006/0020812 A1* | 1/2006 | Steinberg et al. | 713/181 |
| 2006/0020815 A1 | 1/2006 | Varghese et al. | |
| 2006/0026433 A1* | 2/2006 | Montenegro | 713/181 |
| 2006/0041759 A1* | 2/2006 | Kaliski et al. | |
| 2006/0045309 A1 | 3/2006 | Suthahran | |
| 2006/0053293 A1* | 3/2006 | Zager et al. | 713/176 |
| 2006/0059111 A1* | 3/2006 | Tucker et al. | 705/75 |
| 2006/0072745 A1* | 4/2006 | Fukaya | 380/28 |
| 2006/0075027 A1* | 4/2006 | Zager et al. | 709/206 |
| 2006/0075028 A1* | 4/2006 | Zager et al. | 709/206 |
| 2006/0090073 A1* | 4/2006 | Steinberg et al. | 713/170 |
| 2006/0095955 A1* | 5/2006 | Vong | 726/3 |
| 2006/0101120 A1* | 5/2006 | Helsper et al. | 709/206 |
| 2006/0104446 A1 | 5/2006 | Varghese et al. | |
| 2006/0120607 A1* | 6/2006 | Lev | 382/217 |
| 2006/0123464 A1* | 6/2006 | Goodman et al. | 726/2 |
| 2006/0123478 A1* | 6/2006 | Rehfuss | 726/22 |
| 2006/0130122 A1 | 6/2006 | Konno | |
| 2006/0156016 A1 | 7/2006 | Tanaka | |
| 2006/0165307 A1* | 7/2006 | Kondo et al. | 382/249 |
| 2006/0168066 A1* | 7/2006 | Helsper et al. | 709/206 |
| 2006/0174339 A1* | 8/2006 | Tao | 726/18 |
| 2006/0206709 A1* | 9/2006 | Labrou et al. | 713/167 |
| 2006/0206713 A1* | 9/2006 | Hickman et al. | 713/176 |
| 2006/0206717 A1* | 9/2006 | Holt et al. | 713/182 |
| 2006/0206918 A1* | 9/2006 | McLean | 726/2 |
| 2006/0206919 A1 | 9/2006 | Montgomery et al. | |
| 2006/0225127 A1 | 10/2006 | Roberts et al. | |
| 2006/0230435 A1* | 10/2006 | Kokumai | 726/4 |
| 2006/0248344 A1* | 11/2006 | Yang | 713/183 |
| 2006/0253446 A1* | 11/2006 | Leong et al. | 707/9 |
| 2006/0253705 A1* | 11/2006 | Roberts et al. | 713/168 |
| 2006/0253706 A1* | 11/2006 | Roberts et al. | 713/168 |
| 2006/0287963 A1 | 12/2006 | Steeves et al. | |
| 2007/0006305 A1* | 1/2007 | Florencio et al. | 726/22 |
| 2007/0033392 A1* | 2/2007 | Ganesan et al. | 713/155 |
| 2007/0033639 A1* | 2/2007 | Goodman et al. | 726/2 |
| 2007/0061567 A1* | 3/2007 | Day et al. | 713/159 |
| 2007/0061734 A1* | 3/2007 | Abdulhayoglu | 715/742 |
| 2007/0074040 A1 | 3/2007 | Lakshmeshwar | |
| 2007/0074119 A1* | 3/2007 | Komine et al. | 715/743 |
| 2007/0083919 A1* | 4/2007 | Heffez | 726/5 |
| 2007/0094500 A1* | 4/2007 | Shannon et al. | 713/170 |
| 2007/0094727 A1* | 4/2007 | Singh | 726/22 |
| 2007/0101137 A1* | 5/2007 | Lambert | 713/168 |

OTHER PUBLICATIONS

Tomashevsky et al., Fractal properties of chaotic dynamical systems in reverse time and its applications, 2005, IEEE.*

Maria Teresa Carta et al., "Exploiting JPEG2000 and JPIP for Image Based Authentication", Image Processing, 2006 IEEE International Conference on Oct. 2006, pp. 3109-3112.

Kanako Yokota et al., "A Proposal of COMPASS (COMminuty Portrait Authentication SyStem)", Cyberworlds, 2005. International Conference on Nov. 23-25, 2005, pp. 5 pp.

Jean-Camile Birget et al., "Graphical Passwords Based on Robust Discretization", IEEE Transactions on Information Forensics and Security, vol. 1, Issue 3, Sep. 2006, pp. 395-399.

Zhi Li et al., "An Association-Based Graphical Password Design Resistant to Shoulder-Surfing Attack", Multimedia and Expo, 2005. ICME 2005. IEEE International Conference on Jul. 6-8, 2005, pp. 245-248.

Julie Thorpe, et al., "Towards Secure Design Choices for Implementing Graphical Passwords", Computer Security Applicatons Conference, 2004. 20th Annual Dec. 6-10, 2004, pp. 50-60.

Wei-Chi Ku et al., "A Remote User Authentication Scheme Using Strong Graphical Passwords", Local Computer Networks 2005. 30th Anniversary. The IEEE Conference on Nov. 15-17, 2005 pp. 351-357.

Matthew Dailey et al., "A Text-Graphics Character CAPTCHA for Password Authentication", IEEE Region 10 Conference vol. B, Nov. 21-24, 2006, pp. 45-48 vol. 2.

Bouletreau, V., et al. "Handwritting and Signature: One or Two Personality Identifiers?" Fourteenth International Conference on Pattern Recognition, Proceedings, Aug. 16-20, 1998. vol. 2, pp. 1758-1760.

Chen, Wen-Shiung and Shang-Yuan Yuan. "A Novel Personal Biometric Authentication Technique Using Human Iris Based on Fractal Dimension Features," IEEE Acoustics, Speech, and Signal Processing, Proceedings, Apr. 6-10, 2003. vol. 3, pp. III-201-III-204.

Distasi, Ricardo, Michele Nappi and Daniel Riccio. "A Range/Domain Approximation Error-Based Approach for Fractal Image Compression," IEEE Transactions on Image Processing, Jan. 2006. vol. 15, No. 1, pp. 89-97.

Dugelay, J.-L. and S. Roche. "Fractal Transform Based Large Digital Watermark Embedding and Robust Full Blind Extraction," IEEE International Conference on Multimedia Computing and Systems, Jun. 7-11, 1999. vol. 2, pp. 1003-1004.

Jakobsson, Markus. "Fractal Hash Sequence Representation and Traversal," IEEE International Symposium on Information Theory, Proceedings Jun. 30-Jul. 5, 2002; pp. 437.

Riccio, Daniel and Michele Nappi. "Deferring Range/Domain Comparisons in Fractal Image Compression," Proceedings of the 12th International Conference on Image Analysis and Processing, Sep. 17-19, 2003; pp. 412-417.

Seropian, A. and Pr. N. Vincent. "Writers Authentication and Fractal Compression," Proceedings of the Eighth International Workshop on Frontiers in Handwriting Recognition, Aug. 6-8, 2002; pp. 434-439.

Yao, Zhen. "Fixed Point in Fractal Image Compression as Watermarking," IEEE International Conference on Image Processing Sep. 14-17, 2003. vol. 2, pp. II-475-478.

ENTRUST,® "Mutual Authentication: Entrust IdentityGuard," http://www.entrust.com/strong-authentication/mutual-authentication/methods.htm, printed Oct. 30, 2006.

Goodrich et al., "*Loud and Clear*: Human-Verifiable Authentication Based on Audio," Department of Computer Science, University of California, Irvine, 2005.

* cited by examiner

US 7,266,693 B1

VALIDATED MUTUAL AUTHENTICATION

FIELD

The subject of the disclosure relates generally to authenticating a user of an online service. More specifically, the disclosure relates to a validated mutual authentication system and method which utilize fractal imagery to authenticate and protect the users of the online service.

BACKGROUND

Individuals use networks such as the Internet to conduct business, communicate with others, make purchases, perform online banking, pay bills, obtain information, advertise, distribute multi-media content, etc. However, as network usage increases, so does the risk of fraud and theft. Unwary network users run the risk of being misrepresented, having their identities or credit card information stolen, having their accounts infiltrated, and/or having their personal information exposed. Criminals are often able to fraudulently obtain such information by using a man-in-the-middle (MITM) process or other attack.

A MITM attack generally refers to where an attacker becomes a network interloper making it possible to read, insert, and/or modify messages sent between two parties without either party knowing that the link between them has been compromised. In addition, attackers often use a phishing site alone or in conjunction with a MITM attack. A phishing site can be a website created by the attacker and which appears to be a genuine banking website, credit card website, etc. Thinking it is a legitimate website, a user enters his/her account authentication information, thereby providing it to the attacker. Attackers can also use chosen-ciphertext attacks (CCA), denial of service attacks, replay attacks, substitution attacks, etc.

Common defenses to MITM and other attacks include the use of encryption, implementation of secure routing practices, using secured connections, and/or using secure authentication protocols such as secure sockets layer (SSL) or transmission layer security (TLS). In addition, many websites are now attempting to increase security by displaying a predetermined image, phrase, stamp, or other indicator to the user. On such websites, the user is required to select or provide the indicator during an enrollment process. The indicator is generally in the form of a jpeg file, bitmap file, or other commonly used image file. In subsequent authentication attempts, the user can be asked to enter his/her user ID. If the user ID is validated, the user can be presented with the indicator that he/she selected during enrollment. If the user sees the correct indicator the user can enter his/her password and complete authentication. If the user does not see the correct indicator the user can be alerted that he/she may be on a phishing site.

While the above-described authentication system provides some security, it does not protect against all attacks. For example, an attacker can still insert his/herself between a user and a legitimate website equipped with the authentication technique, establish a secure connection with the user, and establish a secure connection with the legitimate website. The attacker can also create a convincing phishing site which mimics the legitimate website. The attacker can present the phishing site to the user, receive authentication information from the user, and enter the authentication information into the legitimate website using the secure connection that he/she has established with the legitimate website. The attacker can then receive the indicator associated with the user. The attacker can, in real time, copy or otherwise recreate the indicator and present it to the user. The attacker is able to do this in part because of the form of the indicator and the way in which it is rendered. Current authentication systems do not ensure that the indicator can only be rendered on one device. In addition, current authentication systems cannot effectively encrypt or otherwise protect a jpeg file, bitmap file, or other commonly used image file to prevent the attacker from implementing a real time duplication. Thus, the attacker can convince the user that the user is on a genuine website and obtain all of the user's authentication information. Once the attacker has stolen the authentication information, the attacker can plug the user into the legitimate website such that the user is unaware of the theft. This is an example of just one attack. There are many variations of this and other attacks which can be used to exploit an indicator-based authentication system. Further, the above-described indicator-based authentication system does not provide mutual authentication. Simply displaying an indicator for the user to view does not require any action on the part of the user. Thus, while the use of an indicator can help prove to the user that a website is genuine, the indicator does help prove to the website that the user is genuine.

Another authentication system used by websites can also require a user to select an image, phrase, stamp, or other indicator during an enrollment process. The selected indicator is then displayed to the user each time the user accesses the website from his/her computer and prior to the entry of any authentication information by the user. To accomplish this, the system links the selected indicator to the user's computer. Because of the link, this system is limited in that it requires users to always authenticate from the same computer. The system is also limited because it does not allow multiple users to authenticate from the same computer. Further, the mere presentation of an indicator does not provide mutual authentication. Another authentication system requires users to answer one or more security questions during an enrollment process. During subsequent authentication attempts, the user is again required to answer the one or more security questions to verify the user's identity. However, as described above with reference to an indicator, the questions can easily be reproduced and presented to the user through a phishing site by an attacker.

Thus, there is a need for an authentication system which provides mutual authentication and which is effective against man-in-the-middle attacks and other such attacks. Further, there is a need for an authentication system which utilizes an indicator which cannot be duplicated or recreated in real time. Further yet, there is a need for an authentication system in which the indicator can only be properly rendered on one device. Further yet, there is a need for an authentication system in which the indicator is a fractal image corresponding to a fractal equation.

SUMMARY

A method of authenticating a user through a validated mutual authentication system is provided. In an exemplary embodiment, the method includes establishing a validating fractal image during an enrollment or other process. A plurality of fractal images are provided to a client during an authentication attempt by the user, and the plurality of fractal images includes the validating fractal image. Fractal image selection data is received from the client, and the system uses the received fractal image selection data to determine a fractal image selected by the user from the plurality of fractal images. The user is authenticated only if the fractal image selected by the user is the validating fractal image.

In another exemplary embodiment, a method of authenticating a user through the validated mutual authentication system includes establishing a validating fractal image and establishing a validating portion of the validating fractal image during an enrollment or other process. The validating fractal image is provided to a client during an authentication attempt by the user. The system receives portion selection data from the client, and based on the received portion selection data, determines a portion of the validating fractal image selected by the user. The user is authenticated only if the portion of the validating fractal image selected by the user is the validating portion.

A method of enrolling a user in a validated mutual authentication system is also provided. In an exemplary embodiment, the method includes providing a library of fractal images to a client for presentation to a user. A validating fractal image is selected by the user from the library of fractal images. A mosaic of fractal images is provided to the client for presentation to the user, and the mosaic of fractal images includes the validating fractal image. Fractal image selection data is received from the client, and based on the received fractal image selection data, the system determines a fractal image selected by the user from the mosaic of fractal images. The user is enrolled in the system only if the fractal image selected by the user is the validating fractal image.

A method of encrypting a fractal equation is also provided. In an exemplary embodiment, the method includes establishing a first communication key for communication with a client. The first communication key is divided into one or more units, and at least one of the one or more units of the first communication key are integrated into a fractal equation corresponding to a validating fractal image. An image rendering tool which includes information regarding how the one or more units of the first communication key are integrated into the validating fractal equation is created. The fractal equation and the image rendering tool are sent to the client such that the client can render the validating fractal image.

A computer-readable medium having computer-readable instructions stored thereon is also provided. Upon execution by a processor, the instructions on the computer-readable medium cause the processor to implement an authentication process. The instructions include establishing a validating fractal image. A plurality of fractal images is provided to a client during an authentication attempt by a user, and the plurality of fractal images includes the validating fractal image. Fractal image selection data is received from the client, and the system determines, based on the received fractal image selection data, a fractal image selected by the user from the plurality of fractal images. The user is authenticated only if the fractal image selected by the user is the validating fractal image.

A system for authenticating a user is also provided. In an exemplary embodiment, the system includes a first device and a second device. The first device includes a first application comprising computer code configured to establish a first communication key, integrate the first communication key into a fractal equation which corresponds to a validating fractal image, create an image rendering tool, provide the fractal equation and the image rendering tool to the second device, receive fractal image selection data from the second device, and determine, based at least in part on the received fractal image selection data, whether to authenticate a user of the second device. The first device also includes a first memory configured to store the first application, and a first processor coupled to the first memory and configured to execute the first application. The second device is in communication with the first device through a network. The second device includes a second application comprising computer code configured to establish a second communication key, receive the fractal equation and the image rendering tool from the first device, use the second communication key and the image rendering tool to render the validating fractal image to the user, receive a fractal image selection from the user, generate the fractal image selection data which includes information such that the first device can determine the fractal image selection, and send the fractal image selection data to the first device. The second device also includes a second memory configured to store the second application, and a second processor coupled to the second memory and configured to execute the second application.

In another exemplary embodiment, a method of authenticating a user through the validated mutual authentication system includes establishing a communication key and dividing the communication key into one or more units. At least one of the one or more units is integrated into a fractal equation which corresponds to a validating fractal image. The fractal equation and an image rendering tool are provided to a client during an authentication attempt by the user. Fractal image selection data is received from the client, and the system determines whether to authenticate the user based at least in part on the received fractal image selection data.

Other principal features and advantages will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings.

DETAILED DESCRIPTION

Figure 1:
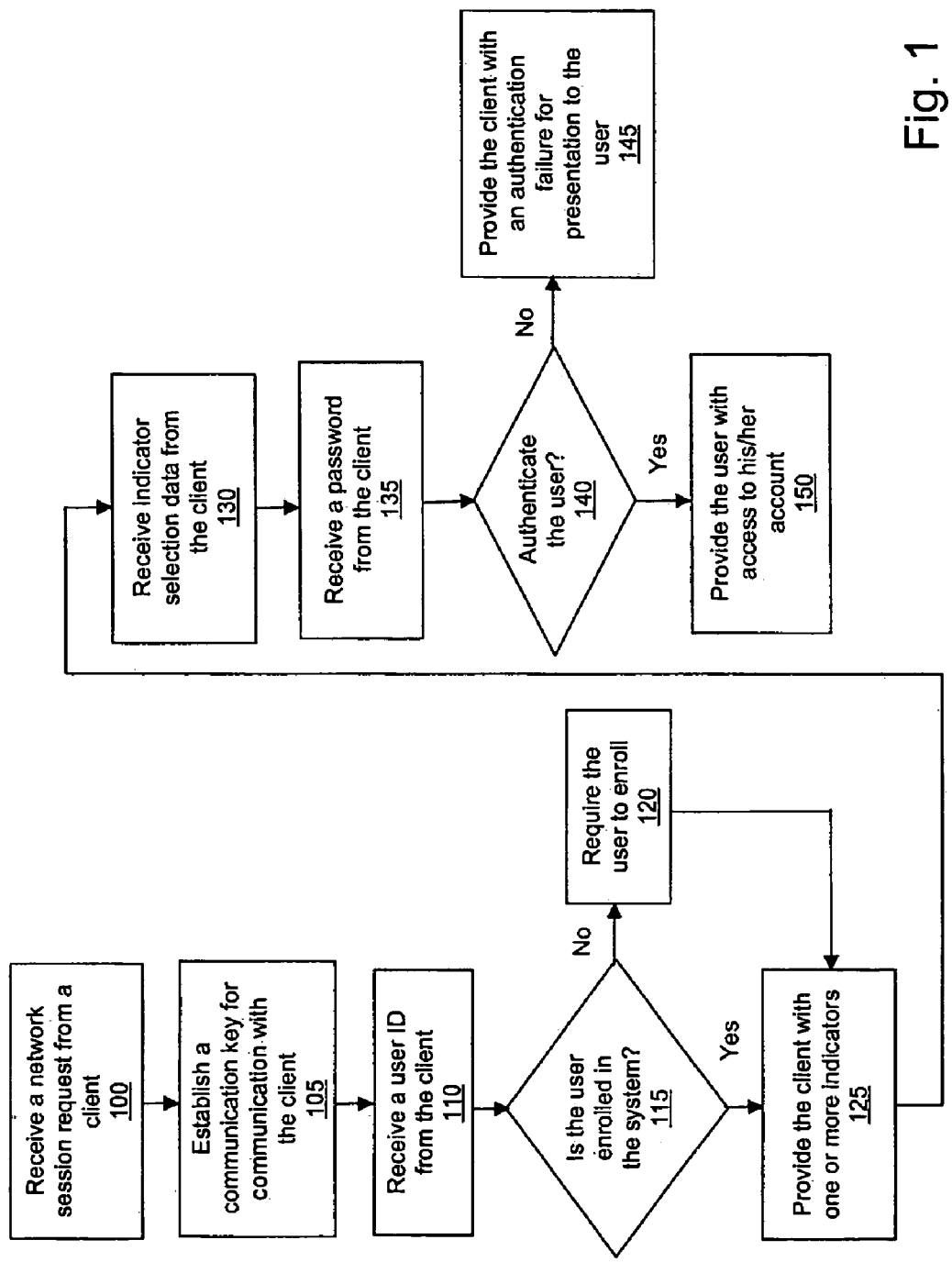
FIG. 1 is a flow diagram illustrating an overview of operations performed by a validated mutual authentication system in accordance with an exemplary embodiment.

FIG. 1 is a flow diagram illustrating an overview of operations performed by a validated mutual authentication system in accordance with an exemplary embodiment. Additional, fewer, or different operations may be performed in alternative embodiments. The validated mutual authentication system (or system) can be incorporated into a network server, implemented as a standalone server or a standalone engine, implemented as a combination of servers and/or engines, and/or implemented as instructions in a computer-readable medium, depending on the embodiment. In an operation 100, a network session request is received from a client. The client can be a desktop computer, laptop computer, cellular phone, personal digital assistant, or any other device capable of communicating across a network. The client can also refer to a network browser or any other application which is capable of accessing and/or communicating with a network accessible webpage. In an exemplary embodiment, the network session request can result when a user uses the client to initiate a session with the network accessible webpage. The network can be the Internet or any other network in which communication can be performed. The network accessible webpage can be provided through a network server or by any other method known to those of skill in the art.

In an operation 105, a communication key for communication with the client is established. The communication key can refer to any key which can be used to encrypt and/or decrypt information exchanged during a communication session over the network. The communication key can also be used to verify the integrity of exchanged information. In an exemplary embodiment, the system and the client can each establish or generate a communication key. For example, the system can establish a first communication key and the client can establish a second communication key. In another exemplary embodiment, the first communication key and the second communication key can be symmetric. The first communication key and the second communication key can be generated by any method known to those of skill in the art. In an exemplary embodiment, the first communication key and/or the second communication key can be secure sockets layer (SSL) session keys which are established using information obtained during an SSL handshake between the system and the client. The SSL session key used by the system can be generated by the network server, an SSL accelerator, an SSL generating engine, or any other method known to those of skill in the art. The SSL session key used by the client can be generated by hardware coupled to the client, the network browser, an SSL accelerator, an SSL generating engine, or any other method known to those of skill in the art. In an alternative embodiment, the first communication key and/or the second communication key can be a transport layer security (TLS) session key.

In an operation 110, a user identification (or user ID) is received from the client. The user ID, which can be established prior to or during enrollment, can be any combination of character(s), symbol(s), sound(s), etc. by which the system is able to identify the user. In an exemplary embodiment, the user ID can be entered into the client by the user through any method known to those of skill in the art. For example, the user can enter the user ID through a keyboard, a touch screen, voice recognition software, an on-screen keyboard with variable key positions, etc. Further, the system can impose any user ID requirements known to those of skill in the art. For example, the user can be required to exclude easily obtainable and/or logical information such as the user's name, the user's birthday, etc. from the user ID. Similarly, the system can impose a minimum number of characters requirement on the user ID, a minimum number of types of characters requirement on the user ID, etc. The user ID can be sent by the client and received by the system through any method known to those of skill in the art. In another exemplary embodiment, the system can determine whether the received user ID corresponds to an active and valid user account. The system can immediately or eventually deny authentication if the received user ID is invalid. The treatment of an invalid user ID is described in more detail with reference to FIG. 3.

In an operation 115, the system can determine, based on the received user ID, whether the user is enrolled in the validated mutual authentication system. If the user is not enrolled in the system, the user is required to enroll in an operation 120. The enrollment process is described in more detail with reference to FIG. 2. If the user is enrolled in the system, the client is provided with one or more indicators in an operation 125. The one or more indicators can be one or more images, or one or more formulas, equations, algorithms, etc. from which one or more images can be rendered. As described in more detail with reference to FIG. 4, the client can render the one or more indicators on a client display such that the user can view the one or more images. In an exemplary embodiment, the one or more indicators can be one or more fractal equations, and the one or more rendered images can be one or more fractal images. While the embodiments described herein generally refer to the one or more indicators as one or more fractal equations (or fractal images), it is to be understood that the embodiments are not so limited. For example, in alternative embodiments, the one or more indicators can be any combination of numbers, letters, equations, etc. which can be rendered as one or more images.

A fractal image generally refers to a graphical representation which is obtained by plotting a fractal equation. Fractal equations are recursive mathematical equations in which the variables can be imaginary numbers. A fractal equation, when plotted on a computer, generates a unique fractal image which can be self-similar or self-repeating. In general, the plots of different fractal equations result in different fractal images. In addition, each fractal equation contains one or more variables which can be altered to produce distinguishable fractal images. It is a well known property of fractals that slight alteration of variables within a fractal equation can produce drastic alteration in the rendered fractal image. Fractals, their unique properties, and their use in the validated mutual authentication system are described in more detail with reference to FIGS. 2-4.

In an exemplary embodiment, the client can be provided with a plurality of indicators. In another exemplary embodiment, the plurality of indicators can be a plurality of fractal equations corresponding to a plurality of fractal images. The client can use the plurality of fractal equations to render a mosaic of fractal images on the client display. One of the fractal images rendered in the mosaic of fractal images can be a validating fractal image established during the enrollment process described with reference to FIG. 2. The validating fractal image can be established by receiving a fractal image selection from the user during the enrollment process. Alternatively, the system can assign the validating fractal image to the user. During each authentication attempt by the user, the user can be prompted to select or otherwise identify the validating fractal image from the mosaic of fractal images. By requiring an affirmative selection from the user, the system can use the validating fractal image to mutually authenticate the user.

In an alternative embodiment, the client can be provided with a single fractal equation. The client can use the single fractal equation to render a single fractal image on the client display. The single fractal image can be a validating fractal image established during the enrollment process. The validating fractal image can be selected by the user during the enrollment process or assigned to the user, depending on the embodiment. In addition, a validating portion of the validating fractal image can be established during the enrollment process. The validating portion can be selected by the user during the enrollment process or assigned to the user, depending on the embodiment. During each authentication attempt by the user, the user can be prompted to select or otherwise identify the validating portion of the validating fractal image. In another alternative embodiment, the user can be prompted to select or otherwise identify the validating portion of the validating fractal image, and the validating fractal image can be presented to the user within a mosaic of fractal images. While the embodiments described herein generally refer to a mosaic or plurality of fractal images, it is to be understood that a single fractal image can be employed within any embodiment.

In an operation 130, the system receives indicator selection data from the client. In an exemplary embodiment, the indicator selection data can be fractal image selection data. The fractal image selection data can include information that allows the system to determine which fractal image from the mosaic of fractal images was selected by the user. Alternatively, the fractal image selection data can include information that allows the system to determine which portion of a fractal image was selected by the user. Fractal image selection data and its use by the system are described in more detail with reference to FIG. 4. In an exemplary embodiment, the system can authenticate the user only if the user selected the validating fractal image from the mosaic of fractal images. Alternatively, the system can authenticate the user only if the user selected the validating portion of the validating fractal image.

In an operation 135, the system receives a password from the client. In an exemplary embodiment, the user can be required to enter a password regardless of whether he/she selected the validating fractal image. As such, an attacker is not able to easily determine the validating fractal image through a process of elimination. Alternatively, the user can be presented with an authentication failure immediately after selecting a non-validating fractal image. The password, which can be established prior to or during enrollment, can be any combination of character(s), symbol(s), sound(s), etc. by which the system is able to identify the user. In an exemplary embodiment, the password can be entered into the client by the user through any method known to those of skill in the art. For example, the user can enter the password through a keyboard, a touch screen, voice recognition software, an on-screen keyboard with variable key positions, etc. Further, the system can impose any password requirements known to those of skill in the art. For example, the user can be required to exclude easily obtainable and/or logical information such as the user's name, the user's birthday, etc. from the password. Similarly, the system can impose a minimum number of characters requirement on the password, a minimum number of types of characters requirement on the password, etc. The password can be sent by the client and received by the system through any method known to those of skill in the art.

In an exemplary embodiment, the user can be presented with a first screen (or webpage) for entering his/her user ID, a second screen for selecting the validating fractal image or validating portion, and a third screen for entering his/her password. In an alternative embodiment, the user can be presented with a first screen for entering his/her user ID and a second screen for selecting the validating fractal image (or validating portion) and entering his/her password. In another alternative embodiment, the user can be presented with a single screen for implementing all of the above-described operations. In other alternative embodiments, any combination and/or number of screens can be used to authenticate the user.

In an operation 140, the system decides whether to authenticate the user. In an exemplary embodiment, the user can be authenticated only if the user enters a correct user ID, selects the validating fractal image (or validating portion), and enters a correct password. If any of the information provided by the user is incorrect or invalid, the client is provided with an authentication failure for presentation to the user in an operation 145. The authentication failure can be presented as a nondescript failure page. Alternatively, the user can be automatically directed back to a user ID entry screen. If the information provided by the user is correct and valid, the user is provided with access to his/her account in an operation 150. The authentication process is described in more detail with reference to FIGS. 2-5.

Figure 2:
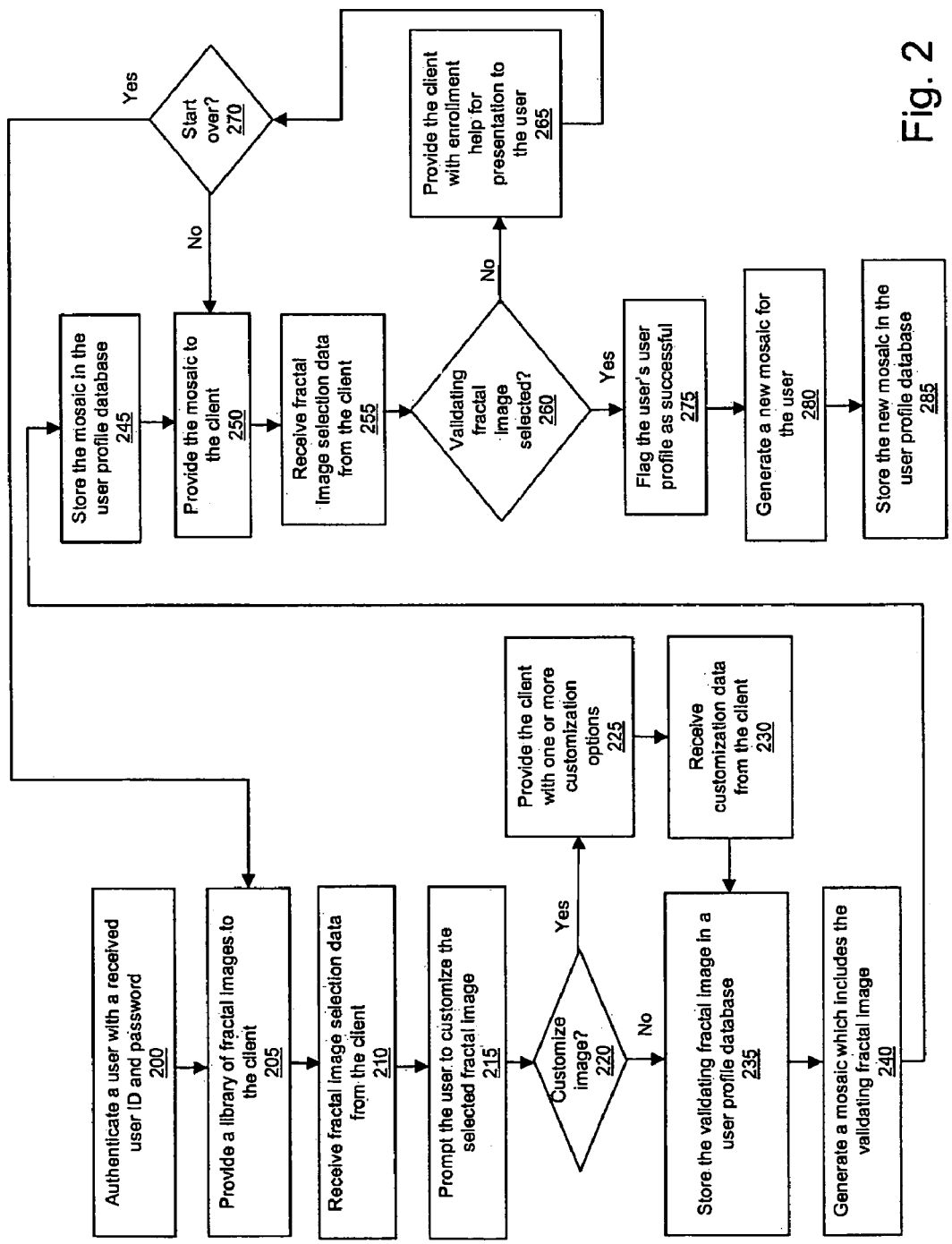
FIG. 2 is a flow diagram illustrating operations performed during a user enrollment process in accordance with an exemplary embodiment.

FIG. 2 is a flow diagram illustrating operations performed during a user enrollment in accordance with an exemplary embodiment. Additional, fewer, or different operations may be performed in alternative embodiments. In an operation 200, a user is authenticated with a received user ID and password. In an exemplary embodiment, if the user enters an invalid user ID or password, the user is not able to enroll. The user can refer to any individual attempting to access a network webpage through a client. The client can refer to any software or hardware used by the user to access and communicate with the network webpage. The system can refer to the validated mutual authentication system used to authenticate the user, any hardware or software used to provide and maintain the network webpage, and/or any hardware or software used to communicate with the client. The user can be an existing user with a previously established user ID and password. Alternatively, new users can establish a user ID and password before or during the enrollment process. In an exemplary embodiment, the user can be provided with information regarding the purpose and goals of the validated mutual authentication system such that the user understands why he/she is being required to enroll in the system.

In an operation 205, the client is provided with a library of fractal images for presentation to the user. The library can include categorized fractal images with exemplary categories including nature and animals, business and technology, food and beverages, house and home, sports and leisure, travel and culture, landscapes, fun images, all images, etc. Alternatively, the fractal images may not be categorized and the user can be presented with a plurality of fractal images on a single screen. The user can be prompted to select a validating fractal image from the library, and the user can enter his/her selection into the client through any method known to those of skill in the art. In an alternative embodiment, the system can assign a validating fractal image to the user.

In an operation 210, the system can receive fractal image selection data from the client. As described in more detail with reference to FIG. 4, the system can use the fractal image selection data to determine which fractal image was selected by the user. In an operation 215, the system can prompt the user to customize the selected (validating) fractal image. In an exemplary embodiment, the user may not be required to customize the selected fractal image. However, in an alternative embodiment, the system may require customization. In an operation 220, the system determines whether the user has decided to customize the selected fractal image. If the user decides to customize his/her fractal image, the user is presented with one or more customization options in an operation 225. The customization options can allow the user to alter any aspect of the selected fractal image which can be controlled by variables within the fractal image. For example, the user can alter the color, size, shape, rotation, perspective, time of day (in a landscape), shading, etc. of the selected fractal image. The user can also alter a portion of the selected fractal image. For example, the user can add snow to mountains in a fractal image landscape. Alternatively, the customization options can allow the user to alter aspects of the selected fractal image, such as a background or a border, which may not be controlled by variables in the fractal equation.

The customization options can be implemented by any method known to those of skill in the art. For example, the user can be presented with a first button to make the fractal image a darker shade and a second button to make the fractal image a lighter shade. When the user presses one of the buttons, the system and/or the client can alter one or more variables in the fractal equation such that the desired alteration occurs. Alternatively, the user can be presented with and allowed to alter variables from the fractal equation directly. In another alternative embodiment, the user can be allowed to click within and/or drag a selected fractal image to alter its appearance. In an operation 230, customization data is received from the client. In an exemplary embodiment, the customization data can be a fractal equation corresponding to the customized fractal image. Alternatively, the customization data can be any information which the system can use to determine how the user customized the selected fractal image to create a new validating fractal image. In an exemplary embodiment, the selected fractal image, as customized, can be the validating fractal image. In an operation 235, the system stores the validating fractal image in a user profile database. The user profile database can include a profile of the user which includes a user ID and a password associated with the user. In an exemplary embodiment, the validating fractal image can be stored as a fractal equation and a set of values for the variables in the fractal equation.

Figure 5:
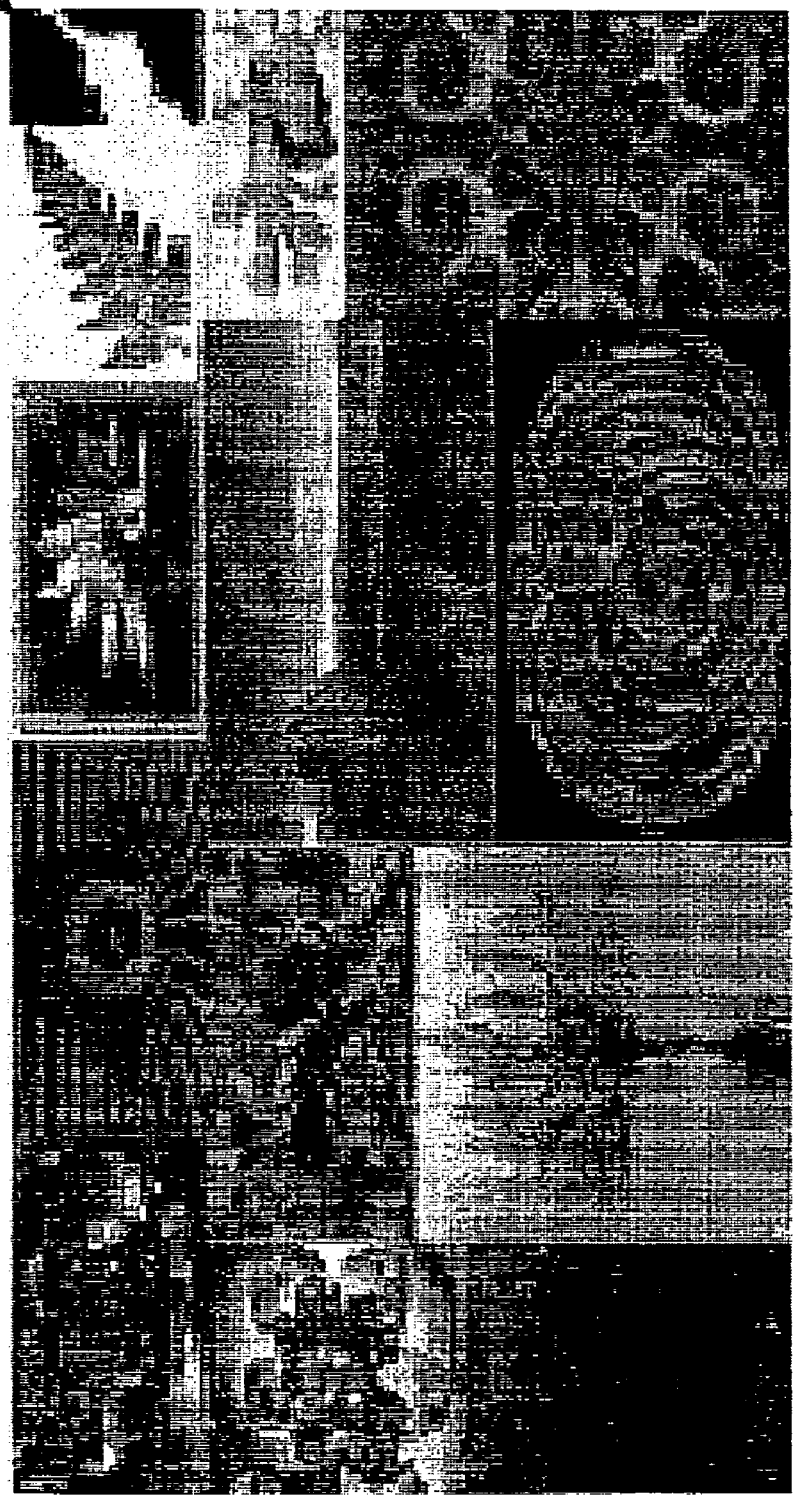
FIG. 5 is a screen shot illustrating a mosaic of sample fractal images in accordance with an exemplary embodiment.

In an operation 240, the system generates a mosaic which includes the validating fractal image. The mosaic can include any number of fractal images. In an exemplary embodiment, each of the non-validating fractal images in the mosaic can be significantly different from the validating fractal image. For example, if the validating fractal image resembles a fern, the mosaic can include the validating fractal image and one or more other fractal images which do not resemble the fern. In an alternative embodiment, one or more of the non-validating fractal images in the mosaic can resemble the validating fractal image. For example, if the validating fractal image resembles a fern, the mosaic can include the validating fractal image and one or more other fractal images which are variations of the fern. FIG. 5 is a screen shot illustrating a mosaic 500 in accordance with an exemplary embodiment. The mosaic 500 includes thirteen distinct fractal images. However, in alternative embodiments, the mosaic can include any number, size, and/or type of fractal images. Mosaic generation is described in more detail with reference to FIG. 3.

Referring again to FIG. 2, the mosaic is stored in the user profile database in an operation 245. The user profile database can be maintained by the system at any location which is accessible to the system. In an exemplary embodiment, all data received and/or sent by the system can be stored in the user profile database for security purposes. The system can also maintain an online fraud analytics database to store all information associated with each authentication attempt received by the system. Among other things, the online fraud analytics database can be used to keep track of and monitor patterns in unsuccessful authentication attempts. In another exemplary embodiment, the mosaic can be stored in the user profile database as a plurality of fractal equations corresponding to the plurality of fractal images in the mosaic. Positional information for each fractal image can also be stored in the user profile database such that the system can provide the fractal images in a specific arrangement. In an exemplary embodiment, the system can also integrate the communication key for the current session into one or more of the fractal equations. Integration of the communication key can help ensure that the mosaic can only be properly rendered on the client. Integration of the communication key and fractal image rendering are described in more detail with reference to FIG. 4.

In an operation 250, the mosaic is provided to the client for presentation to the user. The user can be required to select the validating fractal image from the mosaic of fractal images. In an operation 255, the system receives fractal image selection data from the client. The system determines, based on the received fractal image selection data, whether the user selected the validating fractal image in an operation 260. The process for determining which fractal image is selected is described in more detail with reference to FIG. 4. If the user did not select the validating fractal image, the client is provided with enrollment help for presentation to the user in an operation 265. The enrollment help can provide a walkthrough and/or explain the validated mutual authentication system in detail such that the user can determine why he/she did not select the validating fractal image. In an exemplary embodiment, the user can be given the option to view the mosaic and make another selection after reviewing the enrollment help. The user can also be given the option to start the enrollment process over. In an operation 270, the system determines whether the user wants or is required to start the enrollment process over. If the user does not wish to start over, the client is again provided with the mosaic in operation 250. If the user wishes to start over, the client is again provided with the library of fractal images in operation 205. In an exemplary embodiment, the system can require the user to start the enrollment process from the beginning if the user selects a non-validating fractal image a predetermined number of times. For example, the user can be required to start over if he/she selects non-validating fractal images three times in a row. Alternatively, the predetermined number can be any number, including one.

If the user selects the validating fractal image, the system flags the user's user profile as successful in an operation 275. The flag can be used by the system to determine whether the user's last authentication attempt was successful. As described in more detail with reference to FIG. 3, the flag can also be used to help determine which mosaic to present to the user during a subsequent authentication attempt. In an operation 280, the system generates a new mosaic for the user. In an exemplary embodiment, the new mosaic can include the validating fractal image such that the system can present the new mosaic to the user the next time the user attempts to authenticate. In an operation 285, the new mosaic is stored in the user profile database. In one embodiment, the new mosaic can replace the previously presented mosaic such that the user profile database has only one mosaic associated with the user. Alternatively, previously presented mosaics may not be removed from the user profile database. In an alternative embodiment, a new mosaic can be generated at the time of a subsequent authentication attempt.

Figure 3:
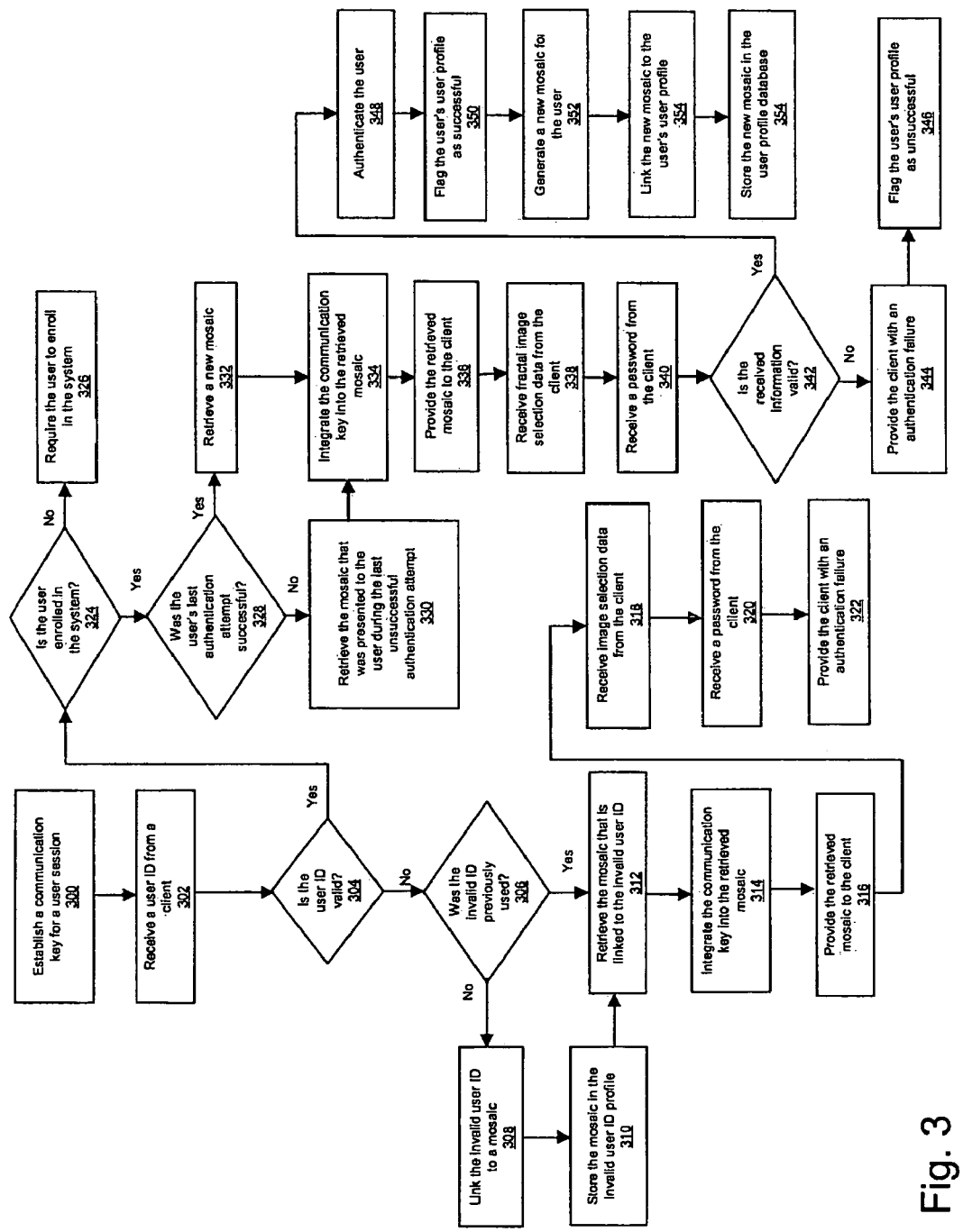
FIG. 3 is a flow diagram illustrating operations performed during an authentication attempt in accordance with an exemplary embodiment.

FIG. 3 is a flow diagram illustrating operations performed during an authentication attempt in accordance with an exemplary embodiment. Additional, fewer, or different operations may be performed in alternative embodiments. In an operation 300, the system establishes a communication key for a user session. The communication key can be the communication key described with reference to FIG. 1. In an operation 302, the system receives a user ID from a client. In an operation 304, the system determines whether the user ID is valid. In an exemplary embodiment, the system can validate the user ID by determining whether the user ID corresponds to an active user account in the user profile database. Alternatively, the system can validate the user ID by any other method known to those of skill in the art.

If the user ID is not valid, the system determines whether the invalid user ID has previously been used during an authentication attempt in an operation 306. In an exemplary embodiment, the system can store an invalid user ID in an invalid user ID profile in the user profile database such that the use of the invalid user ID can be monitored. Alternatively, invalid user IDs can be stored and monitored by any method known to those of skill in the art. If the invalid user ID has not previously been used, the system can link the invalid user ID to a mosaic in an operation 308. In an exemplary embodiment, the system can maintain a pool of mosaics that can be linked to invalid user IDs. Alternatively, the system may not maintain the pool of mosaics, and a mosaic for an invalid user ID can be generated when the system receives the invalid user ID. In an operation 310, the mosaic is stored in the invalid user ID profile.

In an operation 312, the system retrieves the mosaic that is linked to the invalid user ID. If the invalid user ID has previously been used, the system can retrieve the linked mosaic without performing operations 308 and 310 because they have already been performed during a previous unsuccessful authentication attempt. In an operation 314, the communication key can be integrated into the retrieved mosaic such that the fractal images in the mosaic can be properly rendered only on the client. Integration of the communication key and image rendering are described in more detail with reference to FIG. 4.

In an exemplary embodiment, the retrieved mosaic is provided to the client such that the fractal images in the retrieved mosaic can be rendered for the invalid user. In an operation 316, the retrieved mosaic is provided to the client for presentation to the invalid user. In an exemplary embodiment, the same mosaic is presented each time a user attempts to authenticate using the invalid user ID because the mosaic is linked to the invalid user ID. In an alternative embodiment, the system may not link a mosaic to an invalid user ID such that the user can be presented with a different mosaic each time he/she attempts to authenticate with the invalid user ID. For example, the system can present invalid users with a mosaic that is randomly selected from the pool of mosaics. Alternatively, the system can present invalid users with a mosaic that is randomly generated when the user attempts to authenticate with an invalid user ID. In another alternative embodiment, the system may not present the user with a mosaic when the user enters an invalid user ID.

In an exemplary embodiment, the invalid user can be prompted to select a fractal image from the mosaic of fractal images. In an operation 318, the system receives image selection data from the client. In another exemplary embodiment, the invalid user can be prompted to enter a password. Alternatively, the system can provide an authentication failure without requiring the invalid user to enter a password. In an operation 320, the system can receive a password from the client. In an operation 322, the system can provide the client with an authentication failure for presentation to the invalid user. In an alternative embodiment, the system may return the invalid user to a user ID entry page instead of or in addition to presenting the invalid user with an authentication failure. In an exemplary embodiment, the authentication failure can be nondescript such that the invalid user is not able to determine why the authentication attempt failed. As such, the invalid user cannot easily utilize a process of elimination to achieve a fraudulent authentication.

If the system determines that the user ID entered by the user is valid, the system can determine whether the user is enrolled in the validated mutual authentication system in an operation 324. The system can make the enrollment determination by accessing information in the user profile database, or by any other method known to those of skill in the art. If the user is not enrolled in the system, the system can require the user to enroll in an operation 326. The enrollment process is described in detail with reference to FIG. 2.

If the user is enrolled in the system, the system can determine whether the user's last authentication attempt was successful in an operation 328. In an exemplary embodiment, the system can flag the user's user profile as successful or unsuccessful after each authentication attempt. Thus, the system can inspect the flag to determine whether a user's last authentication attempt was successful. Alternatively, the system can monitor authentication success by any other method known to those of skill in the art. If the last authentication attempt was unsuccessful, the system can retrieve the mosaic that was presented to the user during the last unsuccessful authentication attempt in an operation 330. In an exemplary embodiment, the mosaic last presented to the user can be linked to the user's user profile. Alternatively, the system can store the last presented mosaic in any accessible location. In another alternative embodiment, the system can retrieve a new mosaic for presentation to the user regardless of whether the user's last authentication attempt was successful. In another alternative embodiment, the system can retrieve the mosaic presented to the user during the last unsuccessful authentication attempt and rearrange the fractal images in the mosaic prior to presenting the mosaic to the user.

If the last authentication attempt was successful, the system can retrieve a new mosaic in an operation 332. In an exemplary embodiment, the new mosaic can be generated and linked to the user's user profile subsequent to the last successful authentication and prior to the current authentication attempt. Alternatively, the new mosaic can be generated during the current authentication attempt. In an exemplary embodiment, the mosaic retrieved for presentation to the user includes the validating fractal image which was established during the enrollment process described with reference to FIG. 2. The mosaic can also include one or more non-validating fractal images such that mutual authentication can be achieved. The one or more non-validating fractal images can be fractal images from the library of fractal images described with reference to FIG. 2. Alternatively, the one or more non-validating fractal images can be images from the library of fractal images which have been customized by the system. In another alternative embodiment, the one or more non-validating fractal images can be images which are not included in the library of fractal images. In an alternative embodiment, the system may not use a mosaic of fractal images. In such an embodiment, the system can retrieve a single validating fractal image for presentation to the user and the user can be asked to select a validating portion of the validating fractal image.

In an operation 334, the system integrates the communication key into the retrieved mosaic. In an operation 336, the retrieved mosaic is provided to the client for presentation to the user. In an exemplary embodiment, the client renders the fractal images for the user on the client display. Integration of the communication key and fractal image rendering are described in more detail with reference to FIG. 4. The system can require the user to select the validating fractal image from the mosaic of fractal images. In an operation 338, the system receives fractal image selection data from the client. The system can also prompt the user to enter his/her password into the client. In an operation 340, the system receives a password from the client.

In an operation 342, the system determines whether the information received from the user is valid. Determination of whether the user selected the validating fractal image is described in more detail with reference to FIG. 4. If the user selected a non-validating fractal image or entered an incorrect password, the system provides the client with an authentication failure for presentation to the user in an operation 344. In an alternative embodiment, the system may return the user to a user ID entry page instead of or in addition to providing the client with an authentication failure. In an exemplary embodiment, the authentication failure can be nondescript such that the user is not able to determine why the authentication attempt failed. In an operation 346, the system can flag user's user profile as unsuccessful.

If the user selected the validating fractal image and entered the correct password, the system authenticates the user in an operation 348. Once authenticated, the user can be granted access to his/her user account. In an operation 350, the system can flag the user's user account as successful. As such, the system can know to present the user with a new mosaic the next time the user attempts to authenticate. In an alternative embodiment, the system may not flag the user's user account as successful or unsuccessful. In such an embodiment, the user can be presented with a different mosaic each time the user attempts to authenticate. In an operation 352, the system can generate a new mosaic for the user. In an alternative embodiment, the new mosaic can be generated when the user next attempts to authenticate. In an operation 354, the system links the new mosaic to the user's user profile. In an operation 356, the system stores the new mosaic in the user profile database such that the new mosaic can be presented to the user the next time the user attempts to authenticate.

Figure 4:
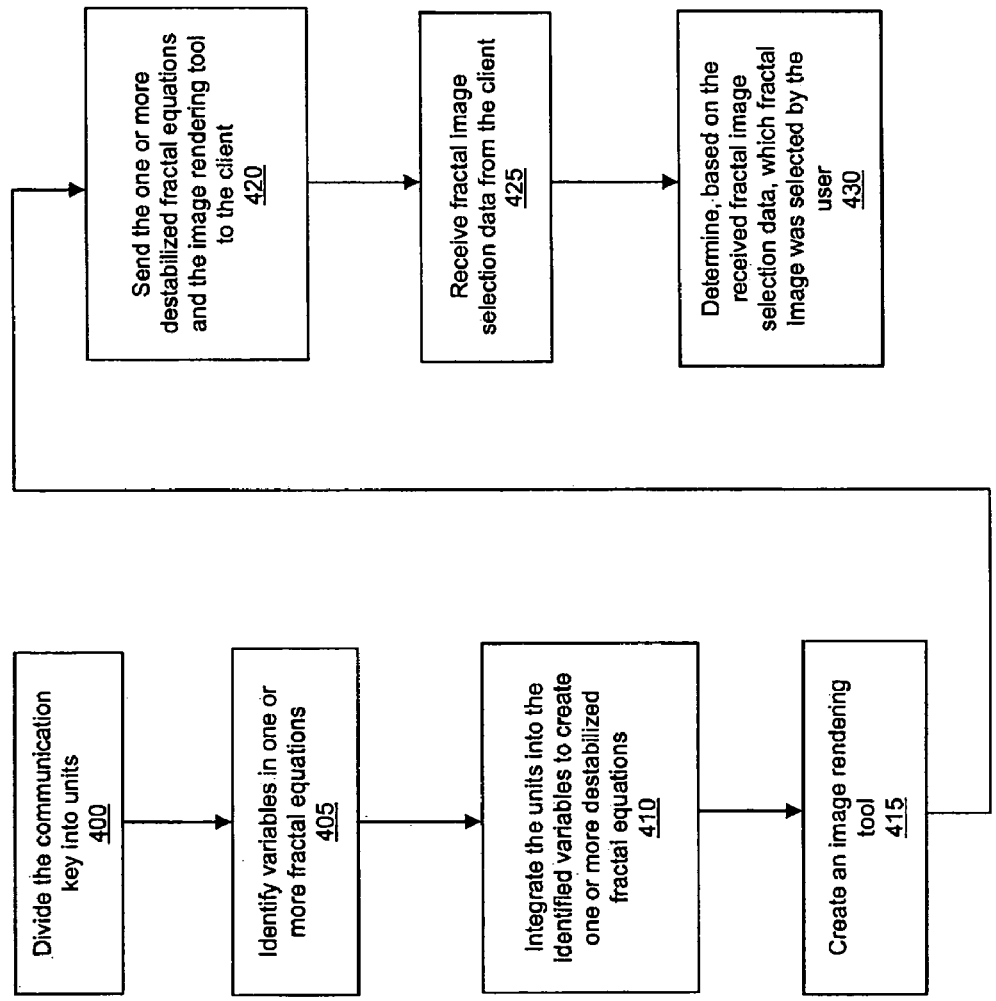
FIG. 4 is a flow diagram illustrating operations performed during a fractal image encryption and rendering process in accordance with an exemplary embodiment.

FIG. 4 is a flow diagram illustrating operations performed during a fractal image encryption and rendering process in accordance with an exemplary embodiment. Additional, fewer, or different operations may be performed in alternative embodiments. As described briefly with reference to FIG. 1, a fractal image can refer to a graphical representation or pattern which is obtained by plotting a fractal equation. There are numerous fractal equations available, each of which can be plotted to obtain a unique fractal image. For example, fractal equations can be used to generate landscapes, complex patterns, plants, trees, mountains, clouds, bodies of water, galaxies, blood vessels, fingerprints, rain droplets, planetary orbits, molecules, sand, coastlines, vortices, snail shells, and many other recognizable images. In addition, slight alteration of the variables in a particular fractal equation can cause significant changes in the fractal image rendered from the fractal equation. As such, a single fractal equation can be used to produce infinitely many distinct fractal images. For example, fractal equation variables can be altered to change the setting of a fractal landscape from day to night. Variables in the fractal equation can also be altered to change the perspective from which the fractal image is viewed, the color pattern of the fractal image, the shape of the fractal pattern, etc.

Fractal equations are recursive mathematical equations in which the variables are imaginary numbers. As a result, fractal images are infinitely self-similar or self-repeating in nature and cannot be represented in classical Euclidean geometry. In fact, because of the infinitely recursive nature of fractal equations, the technology does not exist to render an exact representation of a fractal image. However, modern computers can be used to plot a fractal equation such that an accurate approximation of a fractal image can be obtained. An example of a simple fractal equation (the Mandelbrot equation) is illustrated in Equation 1 below where $Z_n$ is an imaginary variable and c is an imaginary constant of the form a+bi. Various values can be inserted into Equation 1 to obtain the well known Mandelbrot set.

$$Z_{(n+1)}=Z_n^2 c \qquad \text{Equation 1}$$

Fractal images have several advantages over traditional images such as bitmap files, jpeg files, and other 'image' files. Because a fractal image can be represented by a relatively simple mathematical equation, the file size of a fractal image is extremely small compared to a traditional image file. As such, a plurality or mosaic of fractal images can be rapidly sent from the system to a client without utilizing extensive bandwidth. Sending a mosaic of jpeg images to the client would not be nearly as fast or efficient. In addition, the variable nature of fractal equations allows the communication key to be easily integrated therein.

In an operation 400, the system divides the communication key into units. The communication key and its creation are described in detail with reference to FIG. 1. As described in more detail below, dividing (or breaking up) the communication key into units allows different portions of the communication key to be integrated into different portions of a fractal equation. In an exemplary embodiment, the communication key can be a large hexadecimal value. Alternatively, the communication key can be any value capable of being used as a communication key for a user session. The units into which the communication key is divided can be single digits, hex-octets, hex-triplets, or any other hexadecimal or non-hexadecimal portion. In one embodiment, each unit can include the same number of digits. Alternatively, different units can include different numbers of digits. In another alternative embodiment, units of the communication key can be created by placing any combination of communication key digits into one or more mathematical equations, formulas, algorithms, etc.

In an operation 405, the system identifies variables in one or more fractal equations. The identified variables can be the fractal equation variables into which units of the communication key are integrated. In an exemplary embodiment, the system can identify at least one variable in the fractal equation corresponding to the validating fractal image. The one or more fractal equations can represent the one or more fractal images (i.e., the mosaic) which the system provides to the client during an authentication attempt. In an exemplary embodiment, the system can identify variables that, when altered, transform a recognizable fractal image into an unrecognizable conglomeration of color. For example, an original set of variables in a particular fractal equation can be controlled such that the fractal equation produces a fractal image of a mountainous landscape. The system can identify variables within the original set of variables that, when altered by the integration of one or more units, turn the mountainous landscape into an unrecognizable blob of color. As such, the fractal image of a mountainous landscape cannot be properly rendered on a client unless the client is able to restore the original set of variables to the fractal equation. In an alternative embodiment, the system can randomly identify variables in the fractal equations during the authentication attempt. Alternatively, the system can create a predefined fractal structure in which variables in each fractal equation used by the system are identified prior to and/or independent of any authentication attempt.

In an exemplary embodiment, the system can, within each fractal equation, identify a number of variables equal to the number of units into which the communication key is divided in operation 400. As such, the entire communication key can be integrated into each of the one or more fractal equations. For example, if the communication key is divided into eight units, the system can identify eight variables in each of the one or more fractal equations. Alternatively, the system can identify less variables than there are units such that multiple units can be integrated into one or more of the identified variables. For example, if the communication key is divided into eight units and four variables are identified in a particular fractal equation, two units can be integrated into each of the identified variables. Alternatively, one unit can be integrated into a first identified variable, three units can be integrated into a second identified variable, etc.

In an alternative embodiment, the system can, within the entire mosaic of fractal equations, identify a number of variables equal to the number of units into which the communication key is divided in operation 400. In such an embodiment, at least one variable can be identified in each fractal equation such that at least one unit of the communication key can be integrated into each fractal equation. For example, if the mosaic includes twelve fractal images corresponding to twelve fractal equations, the system can divide the communication key into twelve or more units and identify at least one variable in each of the twelve fractal equations such that each fractal equation receives at least one unit. Alternatively, the system may not identify variables in each of the one or more fractal equations. In such an embodiment, at least one of the one or more fractal equations may not have a unit integrated into itself.

In another alternative embodiment, the system can individually divide the communication key for each fractal equation. For example, a first fractal equation can have four identified variables, a second fractal equation can have six identified variables, a third fractal equation can have eight identified variables, etc. The system can divide the communication key into four units for integration into the first fractal equation, six units for integration into the second fractal equation, eight units for integration into the third fractal equation, etc. In other alternative embodiments, the communication key can be divided into any number of units and/or any number of variables can be identified in any of the fractal equations. Further, the system can integrate any number of units into any identified variable.

In an operation 410, the system integrates the units into the identified variables to create one or more destabilized fractal equations. Integration can refer to incorporating the units into the identified variables such that new variables are formed. In an exemplary embodiment, the system can ensure that the new variables cause each fractal equation to render a substantially unrecognizable image. As such, the system can ensure that each of the fractal images is substantially unrecognizable on any device except for the client with which a user session has been established.

Integration can be implemented by replacing the value of an identified variable with one or more units. Integration can also be implemented by performing one or more mathematical operations between an identified variable and one or more units. For example, an identified variable can be numerically represented as two hundred twenty-four and a unit can be numerically represented as seven. Integration can involve multiplying the identified variable by the unit to get a new fractal equation variable of one thousand five hundred sixty-eight. Alternatively, division, addition, or subtraction can be used to integrate the unit with the identified variable. In another alternative embodiment, any combination of more complex mathematical operations can be performed to achieve integration. For example, the system can take the inverse of the square root of the identified variable and multiply it by the cosine of the natural log of the unit to obtain a new variable for the fractal equation. In alternative embodiments, the system can insert any number of units and any number of identified variables into a polynomial formula or other algorithm to obtain one or more new variables for the fractal equation.

In an operation 415, the system creates an image rendering tool. The image rendering tool can be a set of instructions which can be used by the client to restore the original set of variables to each fractal equation within the mosaic of fractal equations such that the fractal images can be properly rendered. In an exemplary embodiment, the image rendering tool can be dependent upon the communication key without including the communication key. The image rendering tool can include formulas, equations, algorithms, descriptions, or any other instructions which can be conveyed to and understood by the client for the purpose of restoring one or more original sets of fractal equation variables.

As a simple example, a first unit can have a numerical value of five, a second unit can have a numerical value of six, a third unit can have a numerical value of seven, and a fourth unit can have a numerical value of eight. In a first fractal equation within a mosaic of fractal equations, a first identified variable can have a value of twenty, a second identified variable can have a value of thirty, and a third identified variable can have a value of forty. To integrate the units into the fractal equation, the first unit and the second unit can be added to one another and the sum can be multiplied by the first identified variable to obtain a new first variable of two hundred twenty. The third unit can be designated as 'x' and the second identified variable can be designated as 'y' in the formula $(x^2+y^2-(63*x))$ to obtain a new second variable of five hundred eight. The fourth unit can be subtracted from the third identified variable to obtain a new third variable of thirty-two.

The first fractal equation can have six total variables, only three of which have been identified. As such, the image rendering tool can include an indication of which variable in the first fractal equation is the first identified variable, which is the second identified variable, and which is the third identified variable. The image rendering tool can also include an indication of how each of the units relates to the communication key. For example, the first unit can be the first digit of the communication key, the second unit can be the second digit of the communication key added to the third digit of the communication key, the third unit can be the product of the fourth and fifth digits of the communication key subtracted from the product of the sixth and seventh digits of the communication key, etc. The image rendering tool can also include information which tells the client how to user its symmetric communication key to restore each of the identified variables in each fractal equation. For example, the image rendering tool can inform the client that to restore the first identified variable in the first fractal equation, add the first unit to the second unit and divide the current value of the first variable by the sum. The image rendering tool can also inform the client that to restore the second identified variable, use the formula $(c+(63*x)-x^2)^{(1/2)}$ where c is the current value of the second variable and 'x' is the third unit. Similarly, the image rendering tool can inform the client that to restore the third identified variable, add the fourth unit to the current value of the third variable. This or a similar process can be repeated for each of the other fractal equations within the mosaic of fractal equations. Only the client can have a communication key which is symmetric with the communication key established by the system. As such, only the client can know the proper values for each of the units which are integrated into the fractal equations. It follows that only the client can property render the fractal images.

In an exemplary embodiment, the system can store the image rendering tool, the fractal equations, the identified variables, and other information in the user profile database. As such, the system can use the same image rendering tool and the same identified variables each time a particular mosaic is presented to the user. The same mosaic may be presented multiple times if the user has an unsuccessful authentication attempt. Alternatively, the same mosaic can be presented to different users who have the same validating fractal image. In an alternative embodiment, a different image rendering tool and/or different identified variables can be used each time a mosaic is presented to a user. As described in more detail below, the system can also use the stored fractal equations to assist in determining which fractal image was selected by the user.

In an operation 420, the system sends the one or more destabilized fractal equations and the image rendering tool to the client. In an exemplary embodiment, the destabilized fractal equations and the image rendering tool are sent during an authentication attempt after the system receives a user ID from the user. Alternatively, the destabilized fractal equations and the image rendering tool can be sent to the client at any time during an authentication attempt. The client can use the image rendering tool, the destabilized fractal equations, and the communication key which the client generated for the user session to properly render the mosaic of fractal images on the client display. The fractal images can be rendered by any method known to those of skill in the art. The client can also allow the user to select one of the fractal images by any method known to those of skill in the art.

In an exemplary embodiment, the system and/or the client can be equipped with one or more embedded interactive application(s) capable of properly rendering a mosaic of fractal images and allowing the user to select one of the fractal images. In an exemplary embodiment, the embedded interactive application(s) can be one or more Java applet applications and/or one or more flash rendering applications. Alternatively, the embedded interactive application(s) can be JavaScript and/or one or more signed applications. Alternatively, any other embedded interactive application(s) can be used. In another exemplary embodiment, the embedded interactive application(s) can allow sound to be incorporated into the validated mutual authentication system for compliance with the Americans with Disabilities Act (ADA).

In an operation 425, the system receives fractal image selection data from the client. The fractal image selection data can include one or more fractal equations, positional data, or any other data which can be used by the system to determine the selected fractal image. In an operation 430, the system determines, based on the received fractal image selection data, which fractal image was selected by the user.

In an exemplary embodiment, the user is authenticated only if the user selected the validating fractal image. The user can select an image by clicking inside the image, highlighting the image, entering one or more characters which correspond to the image, etc. In an exemplary embodiment, the image selection by the user can cause the fractal equation corresponding to the selected fractal image to be altered. For example, clicking into a fractal image can cause the embedded interactive application to re-render the fractal image from a perspective which is deeper within the fractal image. Clicking into the fractal image can also cause the embedded interactive application to re-center the fractal image based on the location of the click. The re-rendering and/or re-centering can cause one or more variables in the corresponding fractal equation to be altered. In another exemplary embodiment, after the user selects a fractal image, the client can send the fractal equations as rendered and/or altered to the system. The system can use the fractal equations received from the client to determine which fractal image was selected.

As an example, the mosaic sent to the client can include ten fractal images corresponding to ten fractal equations. The client can use the image rendering tool and the communication key to restore the original set of variables to each of the ten fractal equations such that the fractal images can be properly rendered. The client can present the mosaic of fractal images to the user, the user can recognize the validating fractal image, and the user can select the validating fractal image. For exemplary purposes, the validating fractal image can correspond to the fourth fractal equation. The user selection can alter one or more variables in the fourth fractal equation. Because the first through third and fifth through tenth fractal images were not selected by the user, the first through third and fifth through tenth fractal equations can still include the original set of variables which correspond to properly rendered fractal images. The client can send the ten fractal equations, in their present form, to the system. The system can receive the ten fractal equations from the client. The system can also retrieve the ten original, non-integrated fractal equations from storage. The system can compare the ten received fractal equations to the ten fractal equations retrieved from storage to determine which received fractal equation does not include its original set of variables. Based on the comparison, the system can determine that only the fourth fractal equation does not include its original set of variables. Thus, the system can know that the user selected the fractal image corresponding to the fourth fractal equation. If the fourth fractal equation corresponds to the validating fractal image, the system can allow the user to authenticate if the user enters the correct password. If the fourth fractal equation does not correspond to the validating fractal image, the system can provide the client with an authentication failure regardless of whether the user enters a correct password.

If more than one of the received fractal equations differs from the fractal equations retrieved from storage, the system can be alerted that there is a problem. For example, if the system detects differences in two of the received fractal equations, the system can be alerted that the user may have somehow selected and altered two fractal images. The system can also use the received fractal equations to determine whether the client properly rendered each of the fractal images in the mosaic. For example, If the system detects differences in all of the received fractal images, the system can be alerted that the client was not able to properly render any of the fractal images. In either case, the system can provide the client with an authentication failure regardless of whether the user enters the correct password.

In an alternative embodiment, the client may not send all of the fractal equations as rendered back to the system. The client can send only the fractal equation corresponding to the validating fractal image. Alternatively, the client can send positional data to the system. The positional data can correspond to a location in the screen where the user clicked to make his/her selection. Based on a known position of each fractal image within the screen, the received positional data can be used by the system to determine which fractal image was selected. Alternatively, the system can determine which fractal image was selected by any other method known to those of skill in the art.

The exemplary embodiments of the system can be used to combat man-in-the-middle (MITM) and other attacks. In one type of MITM attack, the attacker inserts his/herself in between a legitimate user and a legitimate website such as an Internet banking website. The attacker can also create a convincing phishing site which appears to be identical to the legitimate website. The attacker can establish a secure connection with the user through the phishing site and a secure connection with the legitimate website. When the user attempts to access the legitimate website, the attacker can present the phishing site to the user. Believing it to be the legitimate website, the user can enter his/her user ID and password into the phishing site. The attacker can, in real time, intercept the user's user ID and password and enter it into the legitimate website through the secure connection between the attacker and the legitimate website. The attacker can then present the legitimate website to the user and the user can perform his/her banking or other activity through the legitimate website. In the end, unbeknownst to the user, the attacker has fraudulently obtained the user's authentication information and now has access to the user's account and potentially other personal information.

Some legitimate websites are now using a predetermined image, phrase, stamp, or other indicator in an attempt to deter various MITM and phishing attacks. The user is required to select or provide the indicator during an enrollment process. In subsequent authentication attempts, the user can be asked to enter his/her user ID. If the user ID is validated, the user can be presented with the indicator that he/she selected during enrollment. If the user sees the correct indicator, the user can enter his/her password and complete authentication. If the user does not see the correct indicator, the user can be alerted that he/she is on a phishing site. This technique may be effective to combat a pure phishing attack because the creator of the phishing site may not know which indicator to present to the user. However, this technique will not work against the above-described MITM attack. In the MITM attack, the attacker has a secure connection with the legitimate website. As such, after the user enters his/her user ID, the attacker can intercept the user ID, enter it into the legitimate website, receive the indicator, duplicate the indicator, and present the indicator to the user. The user, believing that he/she is on the legitimate website, can enter his/her password and the password is intercepted by the attacker.

If the legitimate website has one of the exemplary validated mutual authentication systems described with reference to FIGS. 1-5 in place, an attacker will not be able to successfully perform the above-described MITM attack. An attacker can still insert his/herself between the user and the legitimate website, establish a secure connection with the user, and establish a secure connection between the legitimate website. However, the attacker cannot present the mosaic of fractal images to the user, receive an image selection from the user, or obtain the user's password. As an example, the user can enter his/her user ID into a phishing site created by the attacker and the attacker can enter the user ID into the legitimate website. The legitimate website can send a mosaic of fractal equations and an image rendering tool to the attacker through the secure connection between the attacker and the legitimate website. Because the attacker's computer has a communication key which is symmetric to the legitimate website's communication key, the attacker's computer is able to properly render the mosaic of fractal images. However, this does not help the attacker because the attacker does not know which image to select nor the password to submit after making a correct selection.

Thus, to obtain the obtain access to the user's account, the attacker has to present the mosaic of fractal images to the user in real time. However, this is not possible. The attacker can try to establish a secure user session between the user and the legitimate website. However, the communication key generated by the client will necessarily be different than the communication key generated on the attacker's computer. As described with reference to FIG. 4, the fractal images can only be rendered on the device which has a communication key that is symmetric to the legitimate website's communication key. Thus, the fractal images cannot be properly rendered on the client and the user will know that there is a problem. In addition, the attacker is not able to copy and/or duplicate the mosaic of fractal images for presentation through a phishing site. This is because the fractal images are not files such as jpeg files that can be easily copied and/or duplicated. The fractal images are plots of mathematical equations which contain communication key units integrated into their variables. To reproduce the fractal images, the attacker would have to determine how the communication key has been divided, identify the units of the communication key, determine which variables in the fractal equations have been identified, determine how the units have been integrated into the identified variables, use a reverse engineering process to recreate the mosaic using a communication key generated by the client, and present the fractal images to the user. The technology does not exist to allow an attacker to accomplish this in real time.

Several flow diagrams have been used to describe exemplary embodiments. The use of flow diagrams is not meant to be limiting with respect to the order of operations performed. Further, the foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method of authenticating a user, the method comprising:
    establishing a validating fractal image;
    providing a plurality of fractal images to a client during an authentication attempt by a user, wherein the plurality of fractal images includes the validating fractal image;
    receiving fractal image selection data from the client;
    determining, based on the received fractal image selection data, a fractal image selected by the user from the plurality of fractal images;
    authenticating the user only if the fractal image selected by the user is the validating fractal image;

establishing a communication key during the authentication attempt;

dividing the communication key into one or more units; and integrating the one or more units of the communication key into a plurality of fractal equations corresponding to the plurality of fractal images.

2. The method of claim 1, further comprising receiving a user identification during the authentication attempt.

3. The method of claim 2, further comprising authenticating the user only if the received user identification is a valid user identification.

4. The method of claim 1, further comprising receiving a password during the authentication attempt.

5. The method of claim 4, further comprising authenticating the user only if the received password is a valid password.

6. The method of claim 1, wherein establishing the validating fractal image comprises requiring the user to select the validating fractal image from a library of fractal images during an enrollment process.

7. The method of claim 1, further comprising providing an image rendering tool to the client, wherein the image rendering tool includes information regarding how the units of the communication key are integrated into the plurality of fractal equations such that the plurality of fractal images can be rendered by the client.

8. The method of claim 1, wherein the fractal image selection data comprises one or more fractal equations.

9. The method of claim 1, wherein the fractal image selection data comprises positional data.

10. The method of claim 1, wherein the validating fractal image is customized by the user.

11. A method of enrolling a user in a validated mutual authentication system, the method comprising:

providing a library of fractal images to a client for presentation to a user;

establishing a validating fractal image, wherein the validating fractal image is selected by the user from the library of fractal images;

providing a mosaic of fractal images to the client for presentation to the user, wherein the mosaic of fractal images includes the validating fractal image;

receiving fractal image selection data from the client;

determining, based on the received fractal image selection data, a fractal image selected by the user from the mosaic of fractal images;

enrolling the user only if the fractal image selected by the user is the validating fractal image; and storing a fractal equation corresponding to the validating fractal image in a user profile database.

12. The method of claim 11, further comprising receiving a user identification and a password from the user.

13. The method of claim 12, further comprising establishing the user identification and the password.

14. The method of claim 12, further comprising enrolling the user only if the received user identification is a valid user identification and the received password is a valid password.

15. The method of claim 11, further comprising receiving fractal image customization data from the client.

16. A method of authenticating a user, the method comprising:

establishing a communication key;

dividing the communication key into one or more units;

integrating at least one of the one or more units into a fractal equation, wherein the fractal equation corresponds to a validating fractal image;

providing the fractal equation and an image rendering tool to a client during an authentication attempt by a user;

receiving fractal image selection data from the client; and determining whether to authenticate the user based at least in part on the received fractal image selection data.

* * * * *